US012266986B2

United States Patent
Nakamura et al.

(10) Patent No.: US 12,266,986 B2
(45) Date of Patent: Apr. 1, 2025

(54) BRUSHLESS MOTOR AND ELECTRICALLY-POWERED TOOL

(71) Applicant: Panasonic Intellectual Property Management Co., Ltd., Osaka (JP)

(72) Inventors: Akito Nakamura, Osaka (JP); Kota Kitamura, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 238 days.

(21) Appl. No.: 17/913,401

(22) PCT Filed: Feb. 5, 2021

(86) PCT No.: PCT/JP2021/004394
§ 371 (c)(1),
(2) Date: Sep. 21, 2022

(87) PCT Pub. No.: WO2021/192654
PCT Pub. Date: Sep. 30, 2021

(65) Prior Publication Data
US 2023/0170768 A1 Jun. 1, 2023

(30) Foreign Application Priority Data
Mar. 26, 2020 (JP) .................. 2020-056651

(51) Int. Cl.
H02K 11/33 (2016.01)
H02K 3/52 (2006.01)
H02K 7/14 (2006.01)

(52) U.S. Cl.
CPC ............ H02K 11/33 (2016.01); H02K 3/522 (2013.01); H02K 7/145 (2013.01)

(58) Field of Classification Search
CPC ...... H02K 5/1732; H02K 11/33; H02K 3/522; H02K 7/145; H02K 2203/12; H02K 2203/03
(Continued)

(56) References Cited

U.S. PATENT DOCUMENTS 7,663,285 B2 * 2/2010 Yumoto ................ H02K 3/522
  310/194
7,781,928 B2 * 8/2010 Yumoto ................ H02K 5/15
  310/91
(Continued)

FOREIGN PATENT DOCUMENTS

EP  2139094 B1  12/2009
JP  S54-066103 U  5/1979
(Continued)

OTHER PUBLICATIONS

Translation of foreign document WO 2019082710 A1 (Year: 2019).*
(Continued)

*Primary Examiner* — Alex W Mok
(74) *Attorney, Agent, or Firm* — Rimon P.C.

(57) ABSTRACT

A brushless motor is an inner rotor type brushless motor. The brushless motor includes a plurality of phase coils of multiple phases arranged around a rotation axis, and a plurality of terminals configured to connect the plurality of phase coils of multiple phases to a switching circuit. The plurality of terminals are located inside a circumscribed circle of the plurality of phase coils of multiple phases.

10 Claims, 7 Drawing Sheets

(58) Field of Classification Search
USPC .......................................................... 310/71
See application file for complete search history.

(56) References Cited

U.S. PATENT DOCUMENTS

| | | | |
|---|---|---|---|
| 7,884,520 B2* | 2/2011 | Ishida | H02K 1/148 |
| | | | 310/216.088 |
| 10,328,566 B2* | 6/2019 | Crosby | H02K 3/34 |
| 10,476,346 B2* | 11/2019 | Ueda | H02K 1/16 |
| 10,523,078 B2* | 12/2019 | Yamasaki | H02K 3/522 |
| 2007/0273221 A1 | 11/2007 | Kinoshita et al. | |
| 2009/0127964 A1* | 5/2009 | Yumoto | H02K 3/522 |
| | | | 310/195 |
| 2010/0156208 A1 | 6/2010 | Schaflein et al. | |
| 2014/0139079 A1 | 5/2014 | Kato et al. | |
| 2015/0200576 A1* | 7/2015 | Kinashi | H02K 11/215 |
| | | | 310/71 |
| 2017/0288499 A1 | 10/2017 | Beyerl et al. | |
| 2018/0226856 A1* | 8/2018 | Ueda | H02K 11/33 |
| 2018/0226857 A1* | 8/2018 | Ishizaki | F04D 29/668 |
| 2019/0081526 A1* | 3/2019 | Fukuzawa | H02K 3/522 |
| 2019/0273421 A1 | 9/2019 | Velderman et al. | |

FOREIGN PATENT DOCUMENTS

| | | |
|---|---|---|
| JP | 2007-318885 A | 12/2007 |
| JP | 2013-207867 A | 10/2013 |
| JP | 2014-143858 A | 8/2014 |
| JP | 2017-188981 A | 10/2017 |
| JP | 2017-229124 A | 12/2017 |
| WO | 2019/082710 A1 | 5/2019 |

OTHER PUBLICATIONS

Extended European Search Report dated Jul. 26, 2023 issued in the corresponding European Patent Application No. 21776308.5.
International Search Report dated Apr. 20, 2021 issued in International Patent Application No. PCT/JP2021/004394, with English translation.
Notice of Reasons for Refusal received in corresponding Japanese Application No. 2020-056651, dated Feb. 6, 2024.

* cited by examiner

BRUSHLESS MOTOR AND ELECTRICALLY-POWERED TOOL

CROSS-REFERENCE OF RELATED APPLICATIONS

This application is the U.S. National Phase under 35 U.S.C. § 371 of International Patent Application No. PCT/JP2021/004394, filed on Feb. 5, 2021, which in turn claims the benefit of Japanese Patent Application No. 2020-056651, filed on Mar. 26, 2020, the entire disclosures of which Applications are incorporated by reference herein.

TECHNICAL FIELD

The present disclosure relates to brushless motors and electrically-powered tools, and more particularly to a brushless motor and electrically-powered tools including a cooling mechanism.

BACKGROUND ART

It has been known a cooling mechanism for a motor (see Patent Literature 1).

According to the disclosure of the Patent Literature 1, a rotor and a stator are disposed in a motor case, and a motor cooling air path is formed in the motor case to allow a cooling wind to flow toward at least one of the rotor or the stator. Further, a holder member provided with a driving circuit is mounted on the motor case on one side in a rotor rotation axis direction. A circuit cooling air path is formed to allow a cooling wind to flow toward the drive circuit of the holder member. The circuit cooling air path and the motor cooling air path are formed to be communicated with each other. A fan is disposed in a communication path that connects the cooling air paths. The fan is configured to rotate along with the rotation of the rotor to generate the cooling wind flowing through the cooling air paths.

According to the cooling mechanism for the motor of the Patent Literature 1, the motor and the circuit are assembled together. It is therefore possible to provide a motor that can efficiently cool the motor itself and cool the drive circuit with a small number of parts, without increasing a whole size.

However, the cooling wind mere passes through a gap between the rotor and the stator, and cannot directly cool a coil that generates heat due to a current flowing therethrough. The cooling effect is thus not sufficient.

CITATION LIST

Patent Literature

Patent Literature 1: JP 2007-318885 A

SUMMARY OF INVENTION

The present disclosure is achieved in view of the above problem, and an object thereof is to provide a brushless motor and an electrically-powered tool having an improved cooling efficiency of a coil.

A brushless motor according to one aspect of the present disclosure is a brushless motor of an inner rotor type. The brushless motor includes a plurality of phase coils of multiple phases arranged around a rotation axis, and a plurality of terminals configured to connect the plurality of phase coils of multiple phases to a switching circuit. The plurality of terminals are located inside a circumscribed circle of the plurality of phase coils of multiple phases.

An electrically-powered tool according to one aspect of the present disclosure includes the brushless motor and a housing in which the brushless motor is housed.

DESCRIPTION OF EMBODIMENTS

The embodiments and variations described below is mere ones of example of the present disclosure. The present disclosure is not limited to the embodiments and variations described below. Various modifications may be made to the following embodiments and variations depending on design and the like as long as the object of the present disclosure is achieved.

First Embodiment

A brushless motor 1 and an electrically-powered tool 10 according to the present embodiment will be described with reference to FIGS. 1 to 7.

(1) Overview

Figure 1:
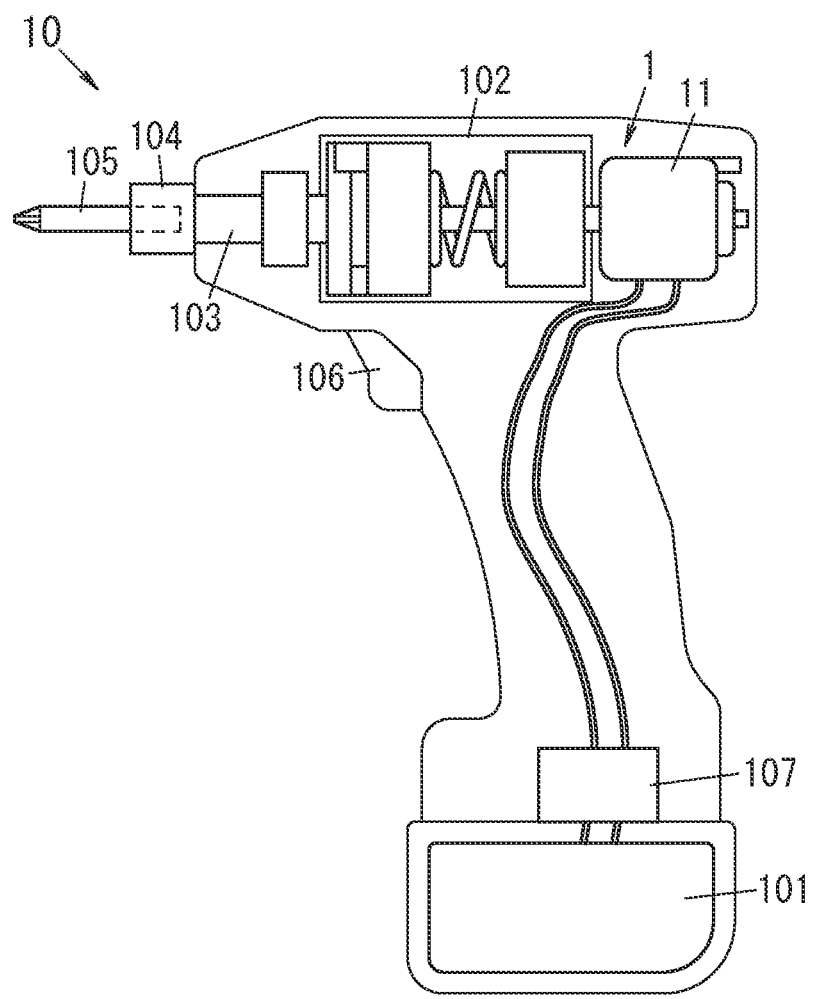
FIG. 1 is a schematic view illustrating an electrically-powered tool of an embodiment.
Figure 2:
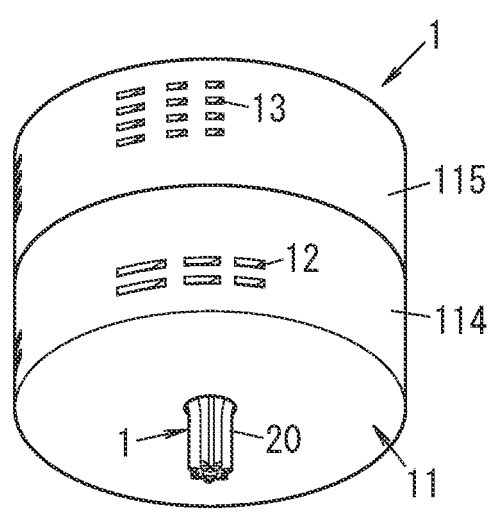
FIG. 2 is a schematic view illustrating a brushless motor and a housing of the embodiment.

As shown in FIGS. 1 and 2, the electrically-powered tool 10 includes the brushless motor 1 and a housing 11 in which the brushless motor 1 is housed. As shown in FIG. 1, the electrically-powered tool 10 further includes a power supply 101, a drive force transmission unit 102, an output unit 103, a chuck 104, a tip tool 105, a trigger volume 106, and a control circuit 107. The electrically-powered tool 10 is a tool configured to drive the tip tool 105 with the drive force of the brushless motor 1.

The brushless motor 1 is a driving source for driving the tip tool 105. The power supply 101 includes a DC power supply for supplying a current to drive the brushless motor 1. The power supply 101 includes one or more secondary batteries, for example. The drive force transmission unit 102 is configured to regulate the output (drive force) of the brushless motor 1 and supply the regulated driving force to the output unit 103. The output unit 103 is configured to be driven (e.g. in rotation) with the drive force supplied from the drive force transmission unit 102. The chuck 104 is fixed to the output unit 103. The tip tool 105 is removably attached to the chuck 104. Examples of the tip tool 105 (bit) include screwdrivers, sockets, and drills. One of those various types of tip tools 105 is selected depending on the intended use and attached for use to the chuck 104. The tip tool 105 of the electrically-powered tool 10 is thus rotatable.

The trigger volume 106 is configured to receive an operation to control the rotation of the brushless motor 1. The brushless motor 1 is switched on or off according to the operation given to the trigger volume 106. The brushless motor 1 is switched from the off state to the on state when the trigger volume 106 receives the pulling operation under the off state of the brushless motor 1. The brushless motor 1 is switched from the on state to the off state when the pulling operation given to the trigger volume 106 is released under the on state of the brushless motor 1. In addition, the rotational speed of the brushless motor 1, accordingly the rotational speed of the output unit 103, is adjusted according to the pulled amount of the trigger volume. In accordance with the operation given to the trigger volume 106, the control circuit 107 starts or stop rotating the brushless motor 1 and also controls the rotational speed of the brushless motor 1. In this electrically-powered tool 10, the tip tool 105 is attached to the chuck 104. The rotational speed of the brushless motor 1, accordingly the rotational speed of the tip tool 105, is controlled according to the operation given to the trigger volume 106.

The electrically-powered tool 10 of the present embodiment includes the chuck 104 that allows the tip tool 105 to be replaced depending on the intended use, but is not limited thereto. The tip tool 105 does not have to be replaceable. Alternatively, the electrically-powered tool 10 may be designed to allow the user to use only a particular type of tip tool 105.

(2) Configuration

A configuration of the brushless motor 1 will be described with reference to FIGS. 2 to 7. The brushless motor 1 may be a 6-pole 9-slot three-phase brushless motor, for example. The "pole" indicates the number of magnetic poles of permanent magnets 21 of a rotor 2. An n-pole and an s-pole are paired each other. When counting the number of magnetic poles, one permanent magnet functioning as an n-pole is counted as "one" pole, and also one permanent magnet functioning as an s-pole is counted as "one" pole. In the present embodiment, the brushless motor is the 6-pole motor, and thus includes three permanent magnets utilizing their n-poles and three permanent magnets utilizing their s-poles. The "slot" indicates the number of coils 32. The "three-phase motor" indicates a motor including three coils whose phases are shifted by 120 degrees from each other.

Figure 5:
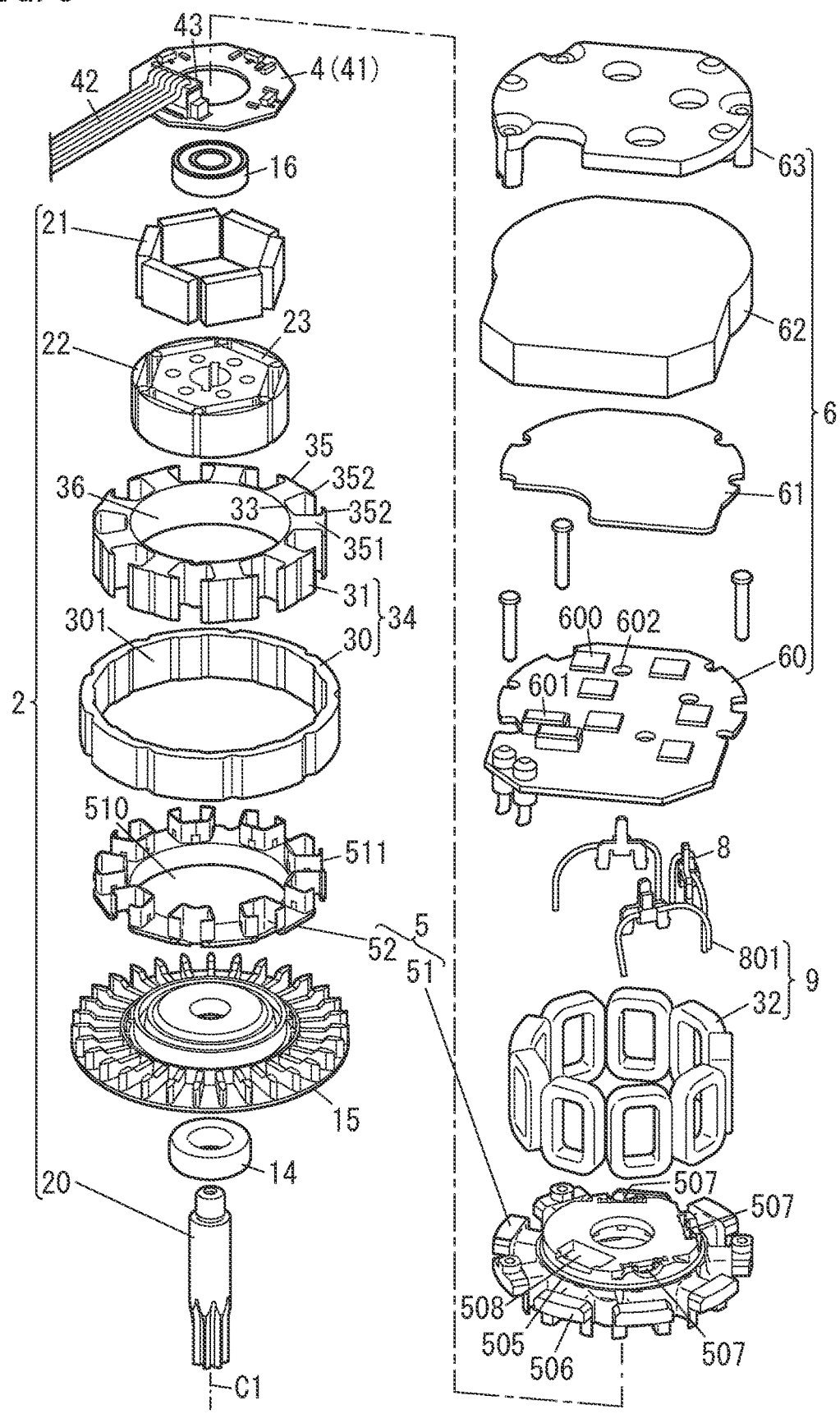
FIG. 5 is an exploded perspective view of the brushless motor of the embodiment.

The brushless motor 1 is an inner rotor type brushless DC motor. As shown in FIG. 5, the brushless motor 1 includes the rotor 2, a stator 3, a sensor board 4, an insulator 5 (coil frame), and a board 6. The brushless motor 1 further includes a first bearing 14, a second bearing 16, a fan 15, a plurality of phase coils U1 to U3, V1 to V3, and W1 to W3 of multiple phases (e.g., three phases, in the present embodiment), a plurality of terminals 8, and a plurality of holding members 507.

(2-1) Housing

As shown in FIG. 2, the housing 11 is an outer cylinder in which the brushless motor 1 is housed. The housing 11 has a circular cylinder shape centered on a rotation axis C1. The housing 11 includes a first casing 114 and a second casing 115. The housing 11 has an exhaust port 12 and an air intake port 13. Through the air intake port 13, the external air is introduced according to the operation of the fan 15 of the brushless motor 1 to cool the coil 32 of the brushless motor 1. Through the exhaust port 12, the intake air is discharged along with the heat. The air flows from a second board side toward a fan 15 side.

(2-2) Rotor

The rotor 2 includes a rotor core 22 having a circular cylinder shape, a plurality of (e.g., six, in the example illustrated in FIG. 5) permanent magnets 21, and an output shaft 20. The output shaft 20 is held inside the rotor core 22 coaxially with the rotor core 22, with the rotation axis C1 as a common axis. The plurality of permanent magnets are respectively fitted in a plurality of holes 23 formed in the rotor core 22. The plurality of permanent magnets 21 are disposed on respective sides of a polygon (e.g., hexagon, in the example illustrated in FIG. 5) surrounding a center of the rotor core 22.

When viewed along the rotation axis C1 of the rotor core 22, the rotor core 22 has a shape of a circle. The "center of the rotor core 22" corresponds to the center of this circle.

The rotor core 22 includes a plurality of steel plates. The rotor core 22 is formed by stacking the plurality of steel plates one on top another in the thickness direction. Each of the steel plate is made of magnetic material (may be a silicon steel plate, for example).

The output shaft 20 is held inside the rotor core 22. As shown in FIG. 5, the rotor core 22 has a shaft hole 221 through which the output shaft 20 passes. The rotor core 22 is rotatable along with the output shaft 20 with respect to the stator 3. The rotor core 22 is configured to rotate in accordance with the magnetic field generated by the current flowing through a plurality of coils 32 of the stator 3. That is, the rotor core 22 has the permanent magnets 21, is configured to rotate in accordance with the magnetic field of the permanent magnets 21 and the magnetic field generated by the current flowing through the coils 32 of the stator 3 and transfers a generated torque to the output shaft 20. The material of the rotor core 22 may be iron, for example. A core of the rotor core 22 may be made of silicon steel containing silicon, permalloy, ferrite, or the like, for example. The rotor core 22 may be made of alloy containing iron, nickel, cupper, carbon and the like to have high strength in order to transfer the generated torque to the output shaft 20.

Each of the permanent magnets 21 may be a neodymium magnet, for example. Two magnet poles of respective permanent magnets 21 are located along the circumference of the rotor core 22. Each of the permanent magnets 21 is magnetized in a radial direction. Two permanent magnets 21, which are adjacent to each other along the circumference of the rotor core 22, are arranged with their magnetic poles different from each other. In other words, the plurality of permanent magnets 21 are arranged such that n- and s-poles alternately appear along the outer circumference of the plurality of permanent magnets 21.

(2-3) Stator

The stator 3 includes a plurality of (e.g., nine, in the illustrated example) coils 32, a stator core 34, and the insulator 5. The stator 3 includes a coil unit 9 including a plurality of phase coils U1 to U3, V1 to V3, and W1 to W3 of multiple phases and a plurality of coil terminals 801. The plurality of coil terminals 801 correspond one to one to the plurality of phase coils U1 to U3, V1 to V3, and W1 to W3 of multiple phases, and allow current to flow through the plurality of phase coils U1 to U3, V1 to V3, and W1 to W3 of multiple phases. The plurality of coils 32 correspond one to one to the phase coils U1 to U3, V1 to V3, and W1 to W3. In the present embodiment, the phase coils are arranged counterclockwise in the order of W1, V1, U1, W2, V2, U2, W3, V3, and U3, when starting from the phase coil W1.

The rotor 2 is disposed inside the stator core 31 to be spaced from a plurality of tooth parts 35. The rotor 2 is configured to rotate around a center axis of a yoke part 30 as the rotation axis C1.

The stator core 34 includes the stator core 31 and the yoke part 30. The yoke part 30 is mounted onto the stator core 31. As shown in FIG. 5, the stator core 31 includes a coupling part 33 of a circular cylinder shape, and the plurality (e.g., nine, in the example illustrated in FIG. 6) of tooth parts 35. The rotor 2 is disposed in a space 36 inside the coupling part 33. Each of the plurality of tooth parts 35 includes a body part 351 and two tip pieces 352. The body part 351 protrudes outward from the coupling part 33 along the radius of the coupling part 33. Each of the two tip pieces 352 extends, from a tip portion of the body part 351, in a direction intersecting with a direction in which the body part 351 protrudes.

The coupling part 33 couples at least some of the plurality of tooth parts 35 arranged side by side.

The plurality of tooth parts 35 protrude from an inner circumferential surface of the yoke part 30. The plurality of phase coils U1 to U3, V1 to V3, and W1 to W3 of multiple phases are provided one to one to the plurality of tooth parts 35.

The plurality of coils 32 are respectively provided to the plurality of tooth parts 35 via the insulator 5. The coil 32 is wound around the body part 351 via the insulator 5. The coupling part 33 is located closer to the rotor 2 than the coil 32 is. In other words, the coupling part 33 is located between the coil 32 and the rotor 2.

The plurality of tooth parts 35 may be separatable. Separatable tooth parts 35 allows each coil 32 to be wound around a corresponding tooth part 35 with the tooth parts 35 separated, and after that, the stator core 31 can be formed. This can increase the space factor of the winding, reduce the cupper loss, and increase the efficiency of the brushless motor 1. The "space factor" means a ratio of the area occupied by the cupper wire to the area of the space where the cupper wire is wound.

The two tip pieces 352 are provided as a stopper preventing the coil 32 from coming off the body part 351. The coil 32 that moves toward a tip portion of the body part 351 will be caught on the two tip pieces 352. The tip piece 352 thus can prevent the coming off of the coil 32.

The stator core 31 of the stator core 34 of the stator 3 includes a plurality of steel members. The stator core 31 is formed by stacking a plurality of steel plates one on top of another in the thickness direction. Each of the steel plates is made of magnetic material, and may be a silicon steel plate, for example.

As shown in FIG. 5, the coupling part 33 has a circular cylindrical shape. The axis of the coupling part 33 agrees with the thickness the plurality of steel plates. The coupling part 33 is continuous along its circumference. In other words, the coupling part 33 is continuous along its circumference without a break.

As shown in FIG. 5, the body part 351 of each of the plurality of tooth parts 35 has a rectangular parallelepiped shape. The coupling part 33 and the tooth parts 35 are formed integrally. The body part 351 protrudes outward from the coupling part 33 along the radius of the coupling part 33. The body parts 351 of the plurality of tooth parts 35 are provided at regular intervals along the circumference of the coupling part 33.

Each of the two tip pieces 352 extends from a tip portion of the body part 351 in the direction intersecting with the direction in which the body part 351 protrudes. Specifically, the two tip pieces 352 are provided on both sides along the circumference of the coupling part 33 at the tip portion of the body part 351. The two tip pieces 352 extends along the circumference of the coupling part 33.

The yoke part 30 includes a plurality of steel plates. The yoke part 30 is formed by stacking the plurality of steel plates one on top of another in the thickness direction. Each steel plate is made of magnetic material, and may be a silicon steel plate, for example. The yoke part 30 has a circular cylindrical shape. The yoke part 30 is mounted on, and surrounds, the plurality of tooth parts 35.

As shown in FIG. 5, the yoke part 30 has, in the inner circumference of the yoke part 30, a plurality (e.g., nine) of fitting portions 301. The yoke part 30 has the fitting portions 301 the number of which is the same as that of the tooth parts 35. Each of the plurality of fitting portions 301 includes a recess provided in the inner circumferential surface of the yoke part 30. The plurality of fitting portions 301 correspond one to one to the plurality of tooth parts 35. Each of the fitting portions 301 and one tooth part 35, corresponding to the fitting portion 301 in question, are fitted to each other by causing at least one of the fitting portion 301 or the tooth part 35 to move along the radius of the coupling part 33. This allows the yoke part 30 to be mounted onto to the plurality of tooth parts 35.

To each fitting portion 301, a portion, including the two tip pieces 352, of an associated tooth part 35 is to be fitted. Thus, the length, measured along the circumference of the yoke part 30, of each fitting portion 301 is equal to the length as measured from the protruding tip of one of the two tip pieces 352 protruding from the body part 351 to the protruding tip of the other of the two tip pieces 352. As used herein, if one value is "equal to" another, these two values do not have to be exactly equal to each other but may also be different from each other within a tolerance range. The tolerance range may be defined by an error of within 3%, within 5%, or within 10%, for example.

With the insulator 5 attached onto the stator core 31 and the coils 32 wound therearound, the yoke part 30 may be mounted onto the plurality of tooth parts 35 by shrink-fitting, for example. Specifically, the yoke part 30 is heated and expanded radially, and then the stator core 31 is put inside the yoke part 30. This makes the inner surface of the yoke part 30 face the respective tips of the plurality of tooth parts 35 along the radius of the coupling part 33 with a narrow gap left between the inner surface of the yoke part 30 and the plurality of tooth parts 35. Thereafter, as the temperature of the yoke part 30 falls to cause the yoke part 30 to shrink, the inner surface of the yoke part 30 comes into contact with the respective tips of the plurality of tooth parts 35. That is, when the plurality of fitting portions 301 move inward along the radius of the yoke part 30 as the yoke part 30 shrinks, the plurality of fitting portions 301 and the plurality of tooth parts 35 are fitted into each other. The yoke part 30 applies, to the plurality of tooth parts 35, contact pressure produced inward along the radius of the yoke part 30.

The insulator 5 is a member having electrical insulation properties. The insulator 5 may be made of resin such as Nylon 66 and may include 30 weight % of filler such as glass fiber, for example.

The insulator 5 is fixed to an end surface of the stator core 31 in a direction along the rotation axis (rotation axis direction X). With the insulator 5, the sensor board 4 is fixed to the stator 3. This can electrically insulate the stator 3 and the sensor board 4 from each other.

As shown in FIG. 5, the insulator 5 includes a first insulator 51 and a second insulator 52. The first insulator 51 and the second insulator 52 may be formed integrally with the stator core 34 of the stator 3 by insertion molding, for example. The first insulator 51 and the second insulator 52 are arranged along the rotation axis direction X.

The first insulator 51 covers a first end in the rotation axis direction X of the stator core 34. Specifically, the first insulator 51 includes a circular ring part 505 and a plurality (e.g., nine in the present embodiment, which is the same as the number of tooth parts 35) of covering parts 506. The circular ring part 505 has an outer diameter substantially the same as an outer diameter of the coupling part 33 having the circular cylindrical shape of the stator core 34. The circular ring part 505 covers a first side in the rotation axis direction X (upper half in the rotation axis direction X, for example) of the coupling part 33 and tooth parts 35. The covering parts 506 are provided on an inner circumferential surface of the circular ring part 505 at regular intervals along the circumference of the circular ring part 505.

The winding of the coil 32 is wound around a corresponding tooth part 35 with the tooth part 35 covered with the covering parts 506, 511. That is, the coil 32 wound around the insulator 5 has a winding axis that intersects with the rotation axis direction X1 of the output shaft 20.

The second insulator 52 covers a second end in the rotation axis direction X of the stator core 34. Specifically, the second insulator 52 includes a circular ring part 510 and a plurality (e.g., nine in the present embodiment, which is the same as the number of tooth parts 35) of covering parts 511. The circular ring part 510 has an outer diameter substantially the same as the outer diameter of the coupling part 33 having the circular cylindrical shape of the stator core 34. The circular ring part 510 covers a second side in the rotation axis direction X of the coupling part 33 and tooth parts 35. The covering parts 511 are provided on an inner circumferential surface of the circular ring part 510 at regular intervals along the circumference of the circular ring part 510.

Nine coils 32 are provided one to one for the nine tooth parts 35. The nine coils 32 are electrically connected to each other. The coil 32 has the winding axis intersecting with the rotation axis direction X of the output shaft 20. The winding of each coil 32 may be an enamel wire, for example. This winding includes a linear conductor and an insulating coating that covers the conductor.

The coils 32 are located outside the coupling part 33. In other words, the coupling part 33 is located on an inner side of the coils 32 (closer to the rotor 2 than the coils 32 are).

The nine coils 32 are arranged around the rotation axis C1 and include a plurality of phase coils of multiple phases. The brushless motor 1 of the present embodiment functions as a three-phase brushless motor. Therefore, the plurality of phase coils of multiple phases includes phase coils of three phases. Specifically, the three phases include U-phase, V-phase, and W-phase. The nine coils 32 function as phase coils U1 to U3, V1 to V3, and W1 to W3. The phase coil U1 is adjacent to the phase coil V1. The phase coil V1 is adjacent to the phase coil W1. The phase coil W1 is adjacent to the phase coil U2. The phase coil U2 is adjacent to the phase coil V2. The phase coil V2 is adjacent to the phase coil W2. The phase coil W2 is adjacent to the phase coil U3. The phase coil U3 is adjacent to the phase coil V3. The phase coil V3 is adjacent to the phase coil W3. The phase coil W3 is adjacent to the phase coil [V1] U1. The plurality of phase coils of multiple phases are arranged around the rotation axis C1 in the prescribed order.

The phase coils U1 to U3 are connected to each other to form a U-phase coil. The phase coils V1 to V3 are connected to each other to form a V-phase coil. The phase coils W1 to W3 are connected to each other to form a W-phase coil.

Figure 6:
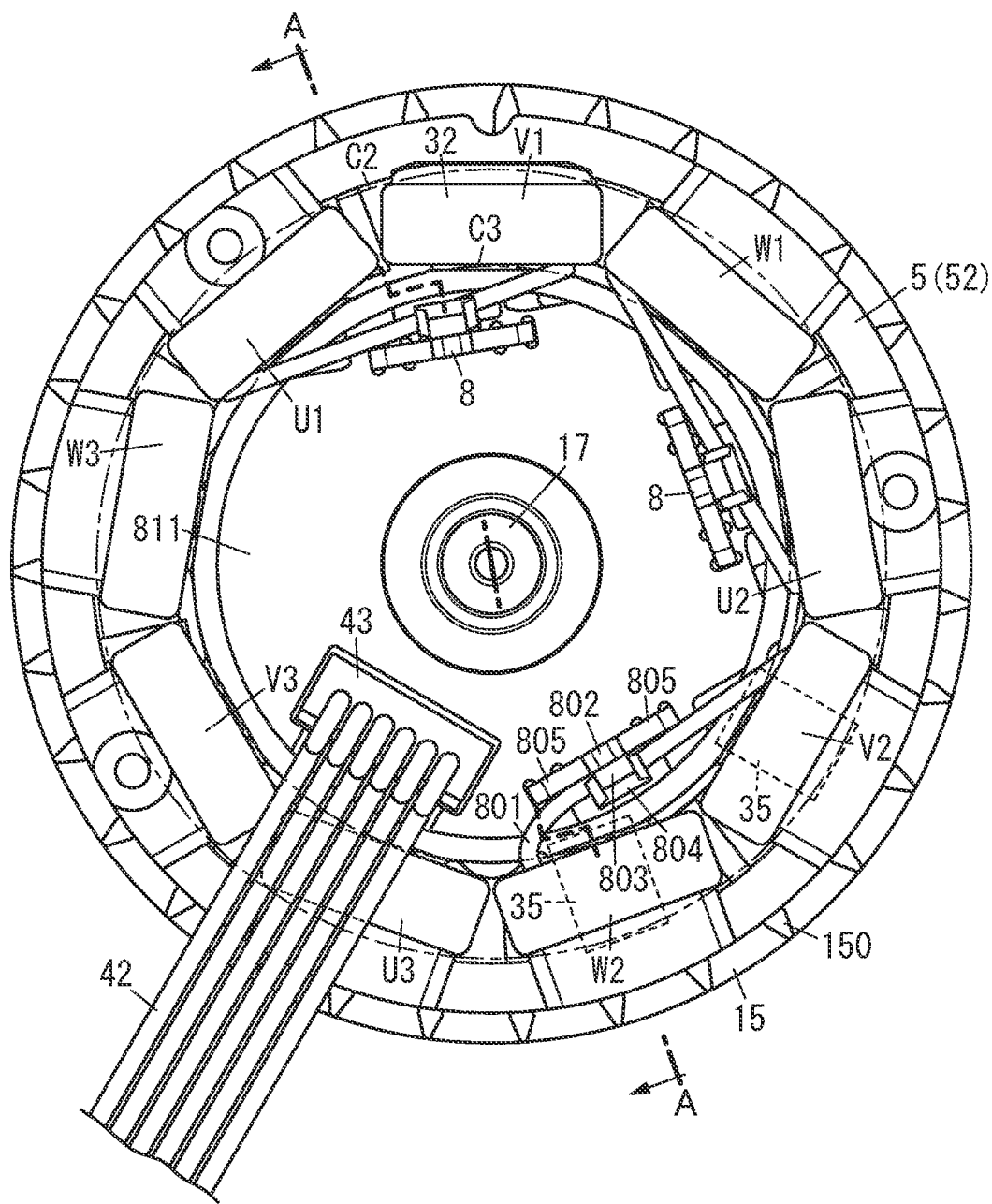
FIG. 6 is a top view of the brushless motor of the embodiment.

The brushless motor 1 includes a plurality of (e.g., three, in the illustrated example) terminals 8 configured to be connected to a switching circuit 600. The plurality of terminals 8 are located inside (close to the center axis of) a circumscribed circle C2 of the plurality of phase coils U1 to U3, V1 to V3, and W1 to W3 of multiple phases. As used herein, the "circumscribed circle" indicates a virtual circle that circumscribes a polygon drawn by connecting respective outer sides of the coils 32 seen in the rotation axis C1, where the coils 32 are arranged around the rotation axis C1 and function as the plurality of phase coils U1 to U3, V1 to V3 and W1 to W3 of multiple phases. The plurality of terminals 8 may be located inside (close to the center of) an inscribed circle C3 of the plurality of phase coils U1 to U3, V1 to V3, and W1 to W3 of multiple phases. As used herein, the "inscribed circle" indicates a virtual circle that inscribes a polygon drawn by connecting respective inner sides of the coils 32 seen in the rotation axis C1, where the coils 32 are arranged around the rotation axis C1 and function as the plurality of phase coils U1 to U3, V1 to V3 and W1 to W3 of multiple phases. In the present embodiment, the coils 32 includes phase coils of three phases, and the phase coils are connected to each other. As described above, the phase coils U1 to U3 are connected to each other, the phase coils V1 to V3 are connected to each other, and the phase coils W1 to W3 are connected to each other, respectively. As shown in FIG. 6, the phase coils of three phases includes total six coil terminals 801 which are connected to the phase coil U1, the phase coil V1, the phase coil W1, the phase coil U2, the phase coil V2, and the phase coil W2, respectively. As used herein, the "coil terminal 801" indicate an end of the wound winding of the coil 32. The phase coil U1 and the phase coil V1 are electrically connected to each other, the phase coil W1 and the phase coil U2 are electrically connected to each other, and the phase coil V2 and the phase coil W2 are electrically connected to each other. Accordingly, a plurality of (e.g., "three" in the example illustrated in FIG. 6) terminals 8 are formed.

The brushless motor 1 further includes a plurality of (e.g., "three" in the example illustrated in FIG. 6) holding member 507 correspond one to one to the plurality of terminals 8. Each of the holding member 507 holds a corresponding terminal 8. The plurality of holding members 507 are held by the insulator 5 having the electrical insulation properties. In the present embodiment, as shown in FIG. 5, the plurality of holding members 507 and the insulator 5 are formed integrally. Specifically, the plurality of holding members 507 are formed integrally with at least part of the insulator 5, e.g., with the first insulator 51. The plurality of holding members 507 correspond one to one to the plurality of terminals 8. Into each of the plurality of holding members 507, a corresponding terminal 8 is fitted. As shown in FIG. 5, the plurality of holding members 507 are formed as recesses. The plurality of terminals 8, fitted into the plurality of holding members 507, are disposed in an inner region surrounded by the plurality of phase coils U1 to U3, V1 to V3 and W1 to W3 of multiple phases and protrude from the insulator 5 toward a side opposite to a tip end of the output shaft. As shown in FIG. 6, each of the plurality of terminals 8 is disposed in a region between corresponding two tooth parts 35, adjacent to each other, of the plurality of tooth parts 35. The reason for this is that the region between two tooth parts 35 adjacent to each other can provide the largest space for conducting some works. The work efficiency thus can be improved.

Figure 7:
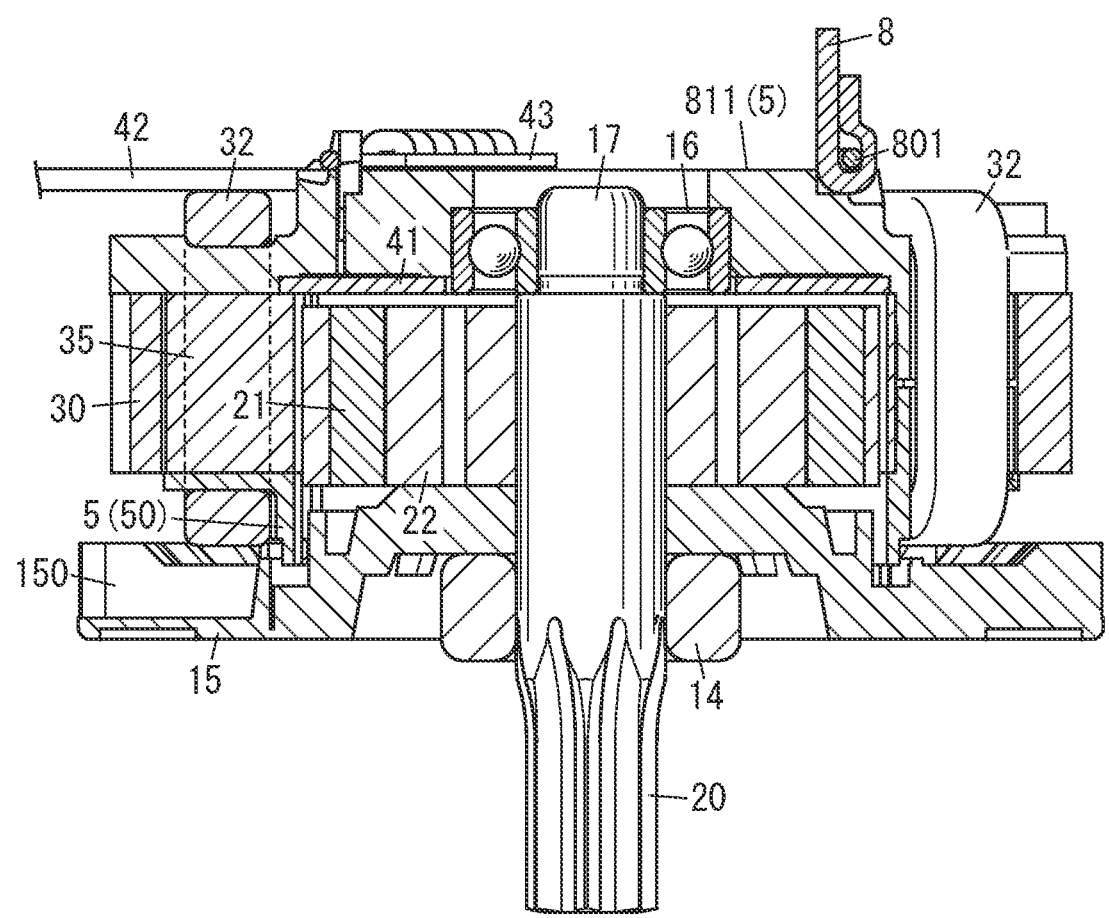
FIG. 7 is a cross section of the brushless motor taken along a line A-A.

As shown in FIGS. 6 and 7, each of the plurality of terminals 8 includes two held parts 805, a wire connecting part 804, a protrusion 802, and a joint part 803. Each of the plurality of terminals 8 is held by the insulator 5 with its two held parts 805 fitted into a holding member 507 of the insulator 5. As shown in FIG. 6, the phase coil U1 and the phase coil V1, which are electrically connected to each other, have one coil terminals 801, respectively. Also, the phase coil W1 and the phase coil U2, which are electrically connected to each other, have one coil terminals 801, respectively. The phase coil V2 and the phase coil W2, which are electrically connected to each other, have one coil terminals 801, respectively. Two coil terminals 801 to be connected each other are clamped by the wire connecting part 804 along with the joint part 803, and thereby the coils are electrically connected to each other. Specifically, the coil terminal 801 of the phase coil U1 and the coil terminal 801 of the phase coil V1 are clamped together by a wire connecting part 804 along with a joint part 803 of a first terminal 8, of the three terminals 8. The coil terminal 801 of the phase coil W1 and the coil terminal 801 of the phase coil U2 are clamped together by a wire connecting part 804 along with a joint part 803 of a second terminal 8, of the three terminals 8. The coil terminal 801 of the phase coil V2 and the coil terminal 801 of the phase coil W2 are clamped together by a wire connecting part 804 along with a joint part 803 of a third terminal 8, of the three terminals 8. Various connecting methods such as soldering may be used for connecting the coil terminal 801 to the terminal, and one preferable example is fusing. The connecting method may be a combination of soldering and fusing. Of course, the connecting method may be soldering. The protrusion 802 protrudes from the insulator 5 toward a side opposite to the tip end of the output shaft. As shown in FIG. 7, the protrusion 802 is joined to the joint part 803, and thereby the coil terminals 801 are held by the wire connecting part 804.

In the present embodiment, the plurality of holding members 507 are formed integrally with the insulator 5. Alternatively, the plurality of holding members 507 may be formed separately from the insulator 5.

The insulator 5 (second insulator 52) holds the second baring (bearing) 16. The second insulator 52 has a bearing support 17. If the plurality of holding members 507 and the insulator 5 are formed as separate bodies, the second insulator 52 may hold the second bearing 16. If the plurality of holding members 507 and the insulator 5 are formed integrally, the plurality of holding members 507 may hold the second bearing 16. In the present embodiment, since the plurality of holding members 507 and the insulator 5 are formed integrally, the bearing 16 is held by the plurality of holding members 507.

(2-4) Sensor Board

The sensor board 4 is disposed between the rotor 2 and the plurality of holding members 507 that is formed integrally with the insulator 5. The sensor board 4 faces the plurality of holding members 507 and is configured to detect a rotation angle of the rotor 2. The sensor board 4 is a circuit board for detecting an angular displacement of the rotor 2. The sensor board 4 is disposed closer to the second insulator 52 with respect to the rotor 2 in the rotation axis direction X, and parallel to an end surface of the rotor 2. On the sensor board 4, a sensor device(s) is mounted. Examples of the sensor device includes Hall elements and angular sensors (GMR). The sensor device is configured to detect the angular displacement of the rotor 2.

The plurality of holding members 507, the sensor board 4 and the rotor 2 are arranged in the rotation axis direction X. The sensor board 4 is disposed between the plurality of holding members 507 and the rotor 2.

(2-5) Board

Figure 3:
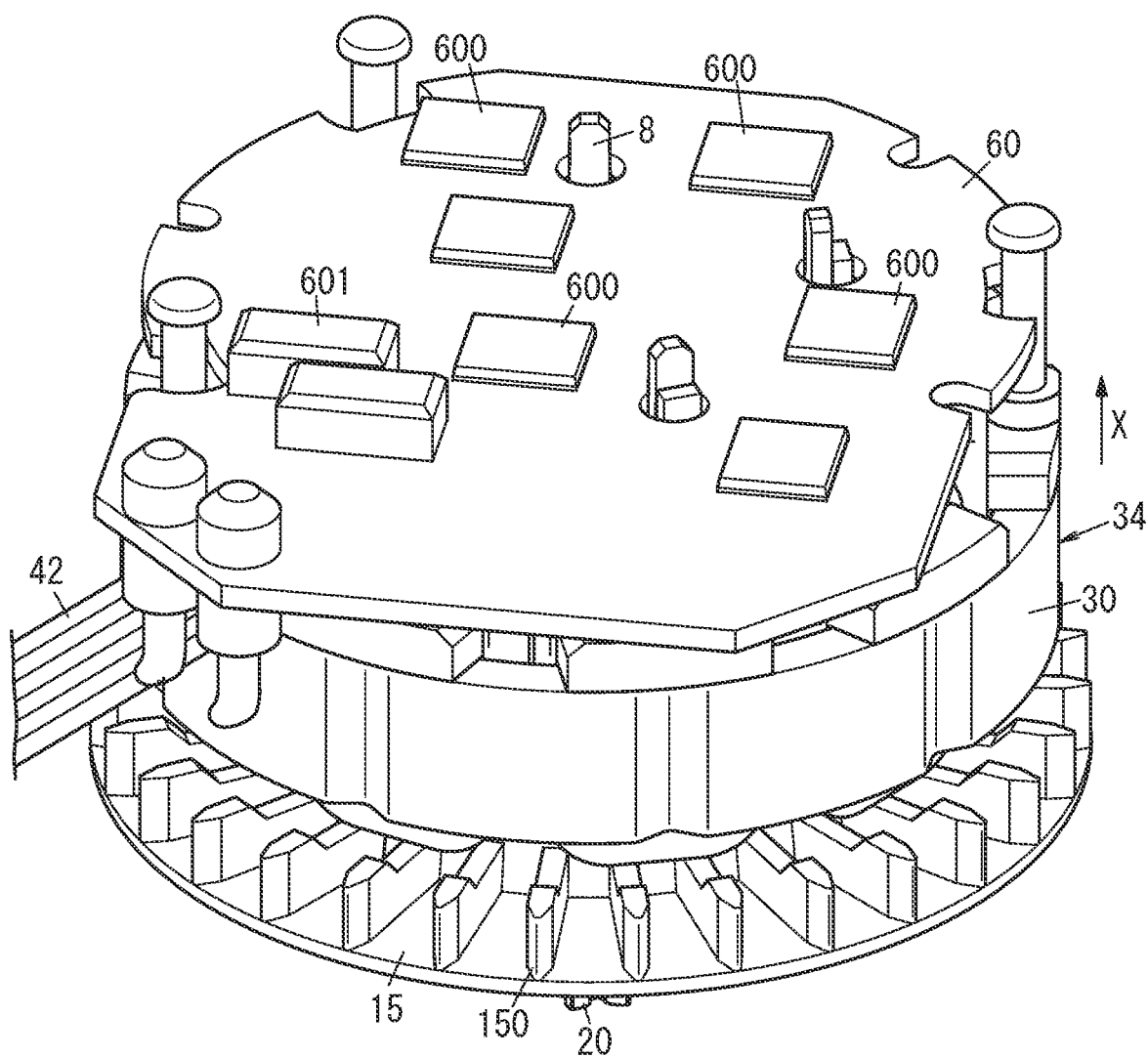
FIG. 3 is a schematic view illustrating the brushless motor of the embodiment.
Figure 4:
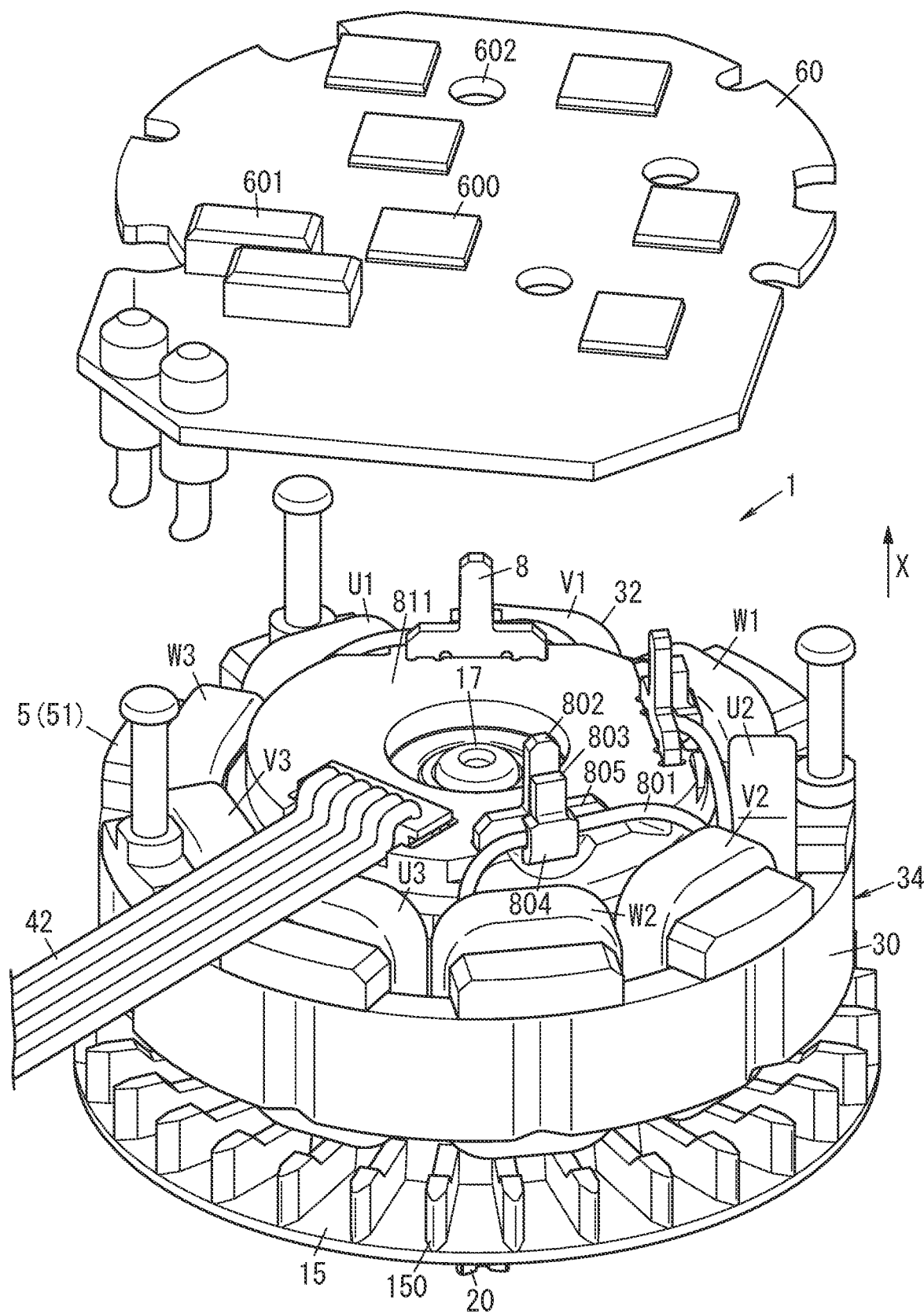
FIG. 4 is a schematic view illustrating an inner mechanism of the brushless motor of the embodiment.

The board 6 includes a drive board 60, a head dissipation sheet 61, a potting part 62, and a heatsink 63. As shown in FIGS. 3 and 4, the drive board 60 includes switching field effect transistors (FETs) 600, a Zener diode 601 of a large capacitance, and three holes 602. The switching FETs 600 are connected to the coils 32 of respective phase coils U1 to U3, V1 to V3, and W1 to W3. The switching FETs 600 control the directions and on and off of the currents flowing through the phase coils U1 to U3, V1 to V3, and W1 to W3. The switching devices of the switching circuit may be a power Metal-Oxide-Semiconductor field-effect transistors (MOSFET). A PWM control circuit repeatedly switches on and off the respective switching device of the switching circuit with a pulse repeat frequency under the PWM control. A processing circuit transmits, to the PWM control circuit, a signal containing a command indicative of a on/off timing and a rotational speed. The Zener diode 601 is configured to absorb the surge current. Into the three holes 602, the three terminals 8 are fitted. As shown in FIG. 4, the three terminals 8 are disposed so as to pass through the one or more holes 602 provided in the drive board 60.

The head dissipation sheet 61 facilitates the dissipation of heat from the switching FET board that generate the heat. The heatsink 63, the head dissipation sheet 61, and the drive board 60 are coupled together with the potting part 62.

The potting part 62 may be used to protect the drive board 60 from the vibration, the humidity, the dust and the like. The material of the potting part 62 may be urethane resin, for example. The heatsink 63 facilitates the dissipation of heat from the potting part 62 and the drive board 60.

(2-6) Bearing

The brushless motor 1 includes two bearings for rotatably supporting the output shaft 20, the first bearing 14 and the second bearing 16. The first bearing 14 is disposed in a recess formed in the fan 15. The second bearing 16 is disposed in the bearing support 17 of the second insulator 52 of the insulator 5. The first bearing 14 and the second bearing 16 have respective inner races fixed to the output shaft 20 and respective outer races fixed to a body of the brushless motor 1. The inner races of the first bearing 14 and the second bearing 16 rotate together with the output shaft 20 according to the rotation of the rotor 2. The first bearing 14 and the second bearing 16 includes respective retainers that hold balls and lubricants in a sealed manner. Accordingly, the outer races of the first bearing 14 and the second bearing 16 can smoothly rotate while the first bearing 14 and the second bearing 16 hold the output shaft 20. Examples of the main material of the first bearing 14 and the second bearing 16 include high carbon chromium steel, medium carbon steel, and silicon nitride ceramics.

(2-7) Fan

The fan 15 is configured to produce the flow of air to cool the stator 3 and the drive board of the brushless motor 1 by the air. Rotation of the fan 15 causes the air to be introduced inside the housing 11 and causes the introduced air to be discharged through the exhaust port 12 along with the heat.

The fan 15 has the recess for accommodating the first bearing 14 at the center of the fan 15. The fan 15 includes blades 150 extending from the recess along the radius of the fan 15.

(3) Operation

When each of the phase coils U1 to U3, V1 to V3, and W1 to W3 is energized, a current flows therethrough to generate a magnetic field. The switching circuit regulates the directions and on and off of the currents to adjust the direction and magnitude of the magnetic fields. The switching circuit is configured to supply the drive currents according to the angular displacement of the rotor 2. The rotor 2 can provide the driving force according to the angular displacement.

The phase coils U1 to U3, V1 to V3, and W1 to W3 are arranged concyclically around the rotation axis C1 at regular angular intervals. In the present embodiment, the coils 32 includes the nine phase coils U1 to U3, V1 to V3, and W1 to W3. The "regular angular interval" is thus 40°. The phase coils U1 to U3 are arranged at regular angular intervals of 120°. The phase coils V1 to V3 are arranged at regular angular intervals of 120°. The phase coils W1 to W3 are arranged at regular angular intervals of 120°. As shown in FIG. 5, the phase coil U1 and the phase coil V1 are arranged adjacent to each other, and the phase coil V1 and the phase coil W1 are arranged adjacent to each other.

The brushless motor 1 has nine slots, and thus the angular interval is 40° as described above. Furthermore, the rotor 2 has six magnetic poles. By way of switching the energizations of the phase coils U1 to U3, V1 to V3, and W1 to W3 every time the rotor 2 rotates 20°, the rotor 2 can rotate continuously. The switching FET circuit regulates the magnitudes and directions of the respective currents flowing through the phase coil U1 to U3, the phase coil V1 to V3, and the phase coil W1 to W3, whereby the rotor 2 continuously rotates.

The coil 32 generates heat when it is energized. However, the coil 32 generating the heat is air-cooled by the fan 15 that rotates along with the rotation of the brushless motor 1. When the air introduced through the air intake port 13 is discharged through the exhaust port 12, the heat is discharged together with the air. As shown in FIG. 6, in the present embodiment, the plurality (e.g., three, in the example illustrated in FIG. 6) terminals 8 are provided inside the inscribed circle of the plurality of phase coils U1 to U3, V1 to V3, and W1 to W3 of multiple phases (e.g., three phases, in the example illustrated in FIG. 6). The cooling wind generated by the fan 15 can reach and cool the coils 32 without being obstructed by the three terminals 8. This can suppress the increase in the resistance of the coil 32 due to the joule heat, and thus can increase the efficiency of the brushless motor 1. Since the cooling wind generated by the fan 15 can cool the coils 32 without being obstructed by the three terminals 8, it is possible to reduce the variability in local temperature of the stator core 31 caused by the presence of the three terminals 8.

(4) Advantages

Locating the plurality of terminals 8 inside the circumscribed circle of the plurality of phase coils U1 to U3, V1 to V3, and W1 to W3 of multiple phases can provide the brushless motor 1 and the electrically-powered tool 10 having the improved cooling efficiency of the coils 32.

Increased cooling efficiency of the coils 32 can suppress the heat generation of the joule heat to reduce the resistance of the coils 32, leading to the improvement of the efficiency of the brushless motor 1.

(5) Variations

Some variations will be enumerated one after another. Note that the variations to be described below may be adopted in combination with the embodiment described above as appropriate.

According to the first embodiment, the board 6 includes the head dissipation sheet 61, but is not limited thereto. The board 6 may not include the head dissipation sheet 61.

According to the first embodiment, each of the plurality of terminals 8 is disposed in a region between corresponding two tooth parts 35, adjacent to each other, of the plurality of tooth parts 35, but is not limited thereto. Although it is preferably disposed in the region between tooth parts 35 adjacent to each other, it may be disposed at a region other than the region between tooth parts 35 adjacent to each other.

According to the first embodiment, the plurality of terminals 8 are located inside the inscribed circle of the plurality of phase coils U1 to U3, V1 to V3, and W1 to W3 of multiple phases, but are not limited thereto. It is sufficient that the plurality of terminals 8 are located inside the circumscribed circle of the plurality of phase coils U1 to U3, V1 to V3, and W1 to W3 of multiple phases. They may be located on or above the plurality of phase coils U1 to U3, V1 to V3, and W1 to W3 of multiple phases in the rotation axis direction X.

Summary

According to the above description, a brushless motor (1) of a first aspect is an inner rotor type brushless motor. The brushless motor (1) includes a plurality of phase coils (U1 to U3, V1 to V3, W1 to W3) of multiple phases arranged around a rotation axis (C1), and a plurality of terminals (8) configured to connect the plurality of phase coils (U1 to U3, V1 to V3, W1 to W3) of multiple phases to a switching circuit (600). The plurality of terminals (8) are located inside a circumscribed circle (C2) of the plurality of phase coils (U1 to U3, V1 to V3, W1 to W3) of multiple phases.

Since the plurality of terminals (8) are located inside the circumscribed circle (C2) of the plurality of phase coils (U1 to U3, V1 to V3, W1 to W3) of multiple phases, this aspect can provide the brushless motor (1) and an electrically powered tool (10) having the improved cooling efficiency of the coils (32). It is accordingly possible to suppress the heat generation of the joule heat, leading to the improvement of the efficiency of the brushless motor (1).

A brushless motor (1) of a second aspect in accordance with the first aspect further includes a plurality of holding members (507) corresponding one to one to the plurality of terminals (8). Each of the plurality of holding members (507) holds a corresponding one of the plurality of terminals (8).

According to this aspect, the plurality of terminals (8) can be stably held on the insulator (5) with the plurality of holding members (507).

A brushless motor (1) of a third aspect in accordance with the second aspect further includes a yoke part (30), a stator core (31), a stator (3), and an insulator (5). The stator core (31) includes a plurality of tooth parts (35) which protrude from an inner circumferential surface of the yoke part (30) and to which the plurality of phase coils (U1 to U3, V1 to V3, W1 to W3) of the multiple phases are provided on a one to one basis. The stator (3) includes a coil unit (9) including the plurality of phase coils (U1 to U3, V1 to V3, W1 to W3) of multiple phases, and a plurality of coil terminals (801) corresponding one to one to the plurality of phases coils (U1 to U3, V1 to V3, W1 to W3) of multiple phases and configured to allow current to flow through the plurality of phase coils (U1 to U3, V1 to V3, W1 to W3) of multiple phases. A rotor (2) is disposed inside the stator core (31) to be spaced from the plurality of tooth parts (35). The rotor (2) is configured to rotate around a center axis of the yoke part (30) as the rotation axis (C1). The insulator (5) is fixed to an end surface of the stator core (31) in a rotation axis direction (X). The plurality of holding members (507) are held on the insulator (5).

According to this aspect, the plurality of coil terminals (8) can be stably situated with the plurality of holding members (507) held on the insulator (5).

In a brushless motor (1) of a fourth aspect in accordance with the third aspect, the plurality of holding members (507) are provided integrally with the insulator (5).

This aspect can secure the degree of the strength of the plurality of holding members (507) integrally formed with the insulator (5). Furthermore, this aspect can reduce the number of parts and thus reduce the fraction defective for the production.

In a brushless motor (1) of a fifth aspect in accordance with the third or fourth aspect, the plurality of tooth parts (35) are separatable.

Since the plurality of tooth parts (35) are separatable, this aspect can increase the space factor of the winding. It is accordingly possible to produce a motor having an increased.

In a brushless motor (1) of a sixth aspect in accordance with any one of the second to fifth aspects, the plurality of holding members (507) further holds a bearing (16).

Since the plurality of holding members (507) further holds the bearing (16), the bearing (16) can be supported inside the brushless motor (1) of this aspect.

In a brushless motor (1) of a seventh aspect in accordance with any one of the third to fifth aspects, a sensor board (4) is disposed between the plurality of holding members (507) and the rotor (2) in the rotation axis direction (X). The sensor board (4) faces the plurality of holding members (507) and is configured to detect a rotation angle of the rotor (2).

According to this aspect, the sensor board (4) can be stably situated.

In a brushless motor (1) of an eighth aspect in accordance with any one of the first to seventh aspects, the plurality of terminals (8) are disposed in an inner region surrounded by the plurality of phase coils (U1 to U3, V1 to V3, W1 to W3) of multiple phases and protrude toward a side opposite to a tip end of an output shaft (20) of the brushless motor.

According to this aspect, since the plurality of terminals (8) are disposed in the inner region surrounded by the plurality of phase coils (U1 to U3, V1 to V3, W1 to W3) of multiple phases and protrude toward a side opposite to the tip end of the output shaft (20), it is possible to reduce a connection length between the plurality of terminals (8) and the switching circuit (600).

In a brushless motor (1) of a ninth aspect in accordance with any one of the first to eighth aspects, each of the plurality of terminals (8) is disposed in a region between corresponding two tooth parts (35), adjacent to each other, of the plurality of tooth parts (35).

In a case of using a machine (manufacturing device) for a process of connecting the connecting the coil (32) with the switching circuit (600), this aspect can provide a space that allows the machine to be placed. Situating the terminal in the largest space between regions where windings are wound can improve the work efficiency.

In a brushless motor (1) of a tenth aspect in accordance with any one of the first to ninth aspects, the plurality of terminals (8) are located inside an inscribed circle (C3) of the plurality of phase coils (U1 to U3, V1 to V3, W1 to W3) of multiple phases.

Since the plurality of terminals (8) are located inside the inscribed circle (C3), the stator (3) includes no object that obstacles the flow of the cooling wind at the outer circumferential part of the stator (3). This aspect accordingly can increase the cooling efficiency of the coil (32). Increased cooling efficiency of the coils (32) can suppress the heat generation of the joule heat, leading to the improvement of the efficiency of the brushless motor (1).

In a brushless motor (1) of an eleventh aspect in accordance with any one of the first to tenth aspects, the plurality of terminals (8) are disposed so as to pass through one or more holes (602) provided in a drive board (60).

This aspect can situate the plurality of terminals (8) near the plurality of switching circuits (600) provided on the drive board (60), leading to the reduction in the length of wiring.

An electrically-powered tool (10) of a twelfth aspect includes the brushless motor (1) of any one of the first to eleventh aspects and a housing (11) in which the brushless motor (1) is housed.

This aspect can provide the electrically-powered tool (10) including a high efficient motor, since the brushless motor (1) is used that can reduce the variability in local temperature of the stator core (31) caused by the presence of the three terminals (8).

REFERENCE SIGNS LIST

1 Brushless Motor
2 Rotor
3 Stator
5 Insulator
507 Holding Member
9 Coil Unit
10 Electrically-Powered Tool
11 Housing
16 Second Bearing (Bearing)
20 Output Shaft
30 Yoke Part
31 Stator Core
32 Coil
35 Tooth Part
60 Drive Board
8 Terminal
600 Switching Circuit
602 Hole
C1 Rotation Axis
C2 Circumscribed Circle
C3 Inscribed Circle
U1, U2, U3, V1, V2, V3, W1, W2, W3 Phase Coil

The invention claimed is:

1. A brushless motor of an inner rotor type, comprising:
a plurality of phase coils of multiple phases arranged around a rotation axis; and
a plurality of terminals configured to connect the plurality of phase coils of multiple phases to a switching circuit,
the plurality of terminals being located inside an inscribed circle of the plurality of phase coils of multiple phases,
the plurality of terminals including respective wire connecting parts, each of which clamps together two coil terminals of two phase coils of the plurality of phase coils to connect the two coil terminals with each other,
the wire connecting parts of the plurality of terminals being located inside the inscribed circle of the plurality of phase coils of multiple phases,
the plurality of terminals being disposed so as to pass through one or more holes provided in a drive board on which a switching element of the switching circuit is mounted.

2. The brushless motor of claim 1, further comprising a plurality of holding members corresponding one to one to the plurality of terminals,
wherein each of the plurality of holding members holds a corresponding one of the plurality of terminals.

3. The brushless motor of claim 2, further comprising:
a stator, including
a stator core including
a yoke part and
a plurality of tooth parts which protrude from an inner circumferential surface of the yoke part and to which the plurality of phase coils of the multiple phases are provided on a one to one basis, and
a coil unit including
the plurality of phase coils of multiple phases, and
a plurality of coil terminals corresponding one to one to the plurality of phases coils of multiple phases and configured to allow current to flow through the plurality of phase coils of multiple phases;
a rotor disposed inside the stator core to be spaced from the plurality of tooth parts, the rotor being configured to rotate around a center axis of the yoke part as the rotation axis; and
an insulator fixed to an end surface of the stator core in a rotation axis direction,
wherein the plurality of holding members are held on the insulator.

4. The brushless motor of claim 3, wherein
the plurality of holding members are provided integrally with the insulator.

5. The brushless motor of claim 3, wherein
the plurality of tooth parts are separatable.

6. The brushless motor of claim 2, wherein
the plurality of holding members further hold a bearing.

7. The brushless motor of claim 3, wherein
a sensor board is disposed between the plurality of holding members and the rotor in the rotation axis direction, the sensor board facing the plurality of holding members and being configured to detect a rotation angle of the rotor.

8. The brushless motor of claim 1, wherein
the plurality of terminals are disposed in an inner region surrounded by the plurality of phase coils of multiple phases and protrude toward a side opposite to a tip end of an output shaft of the brushless motor.

9. The brushless motor of claim 3, wherein
each of the plurality of terminals is disposed in a region between corresponding two tooth parts, adjacent to each other, of the plurality of tooth parts.

10. An electrically-powered tool, comprising:
the brushless motor of claim 1; and
a housing in which the brushless motor is housed.

* * * * *